Dec. 26, 1939.　　　A. J. GRINDLE　　　2,184,297
MELTING APPARATUS
Filed Aug. 12, 1936　　　7 Sheets-Sheet 1
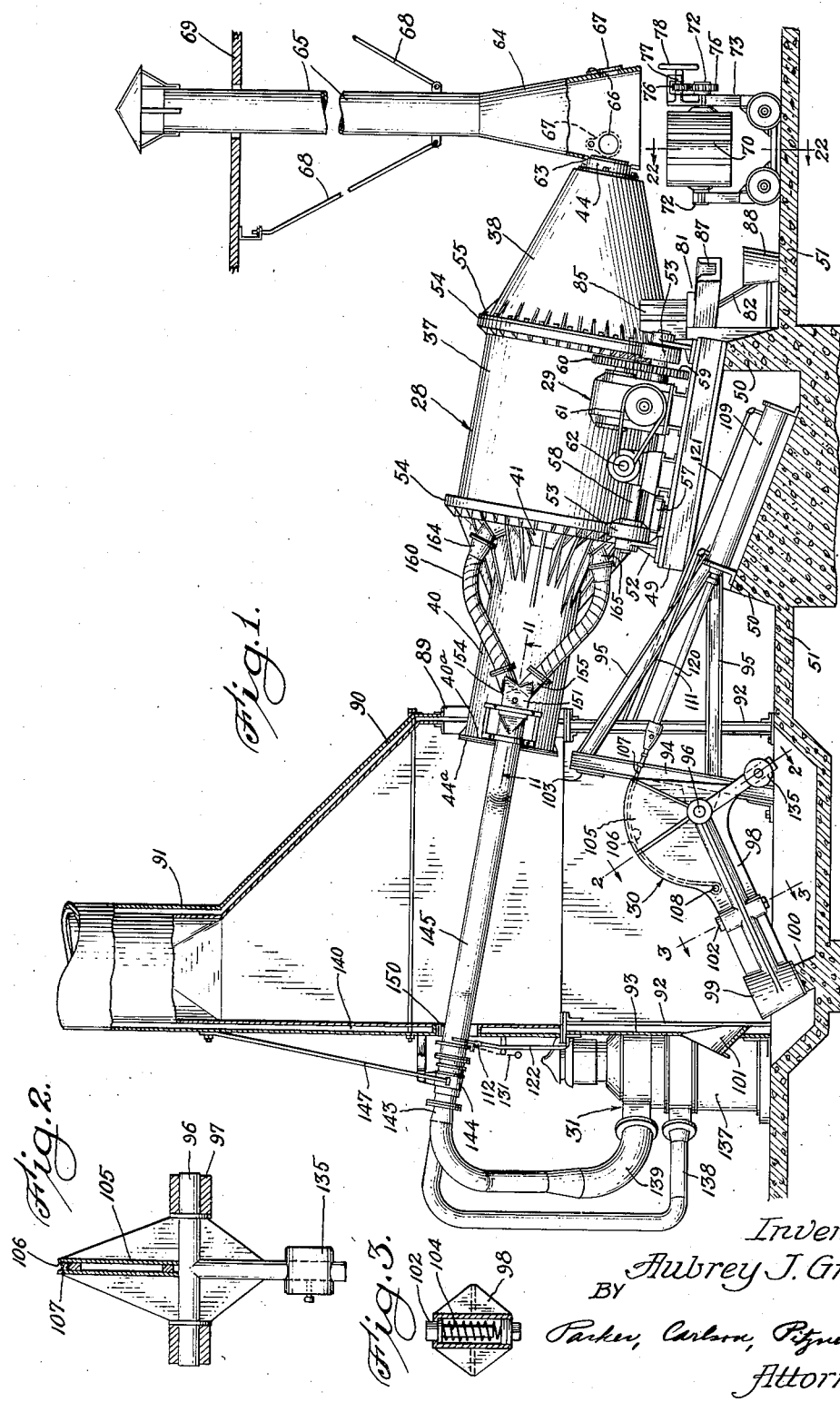
Inventor:
Aubrey J. Grindle
BY
Parker, Carlson, Pitzner & Hubbard
Attorneys.

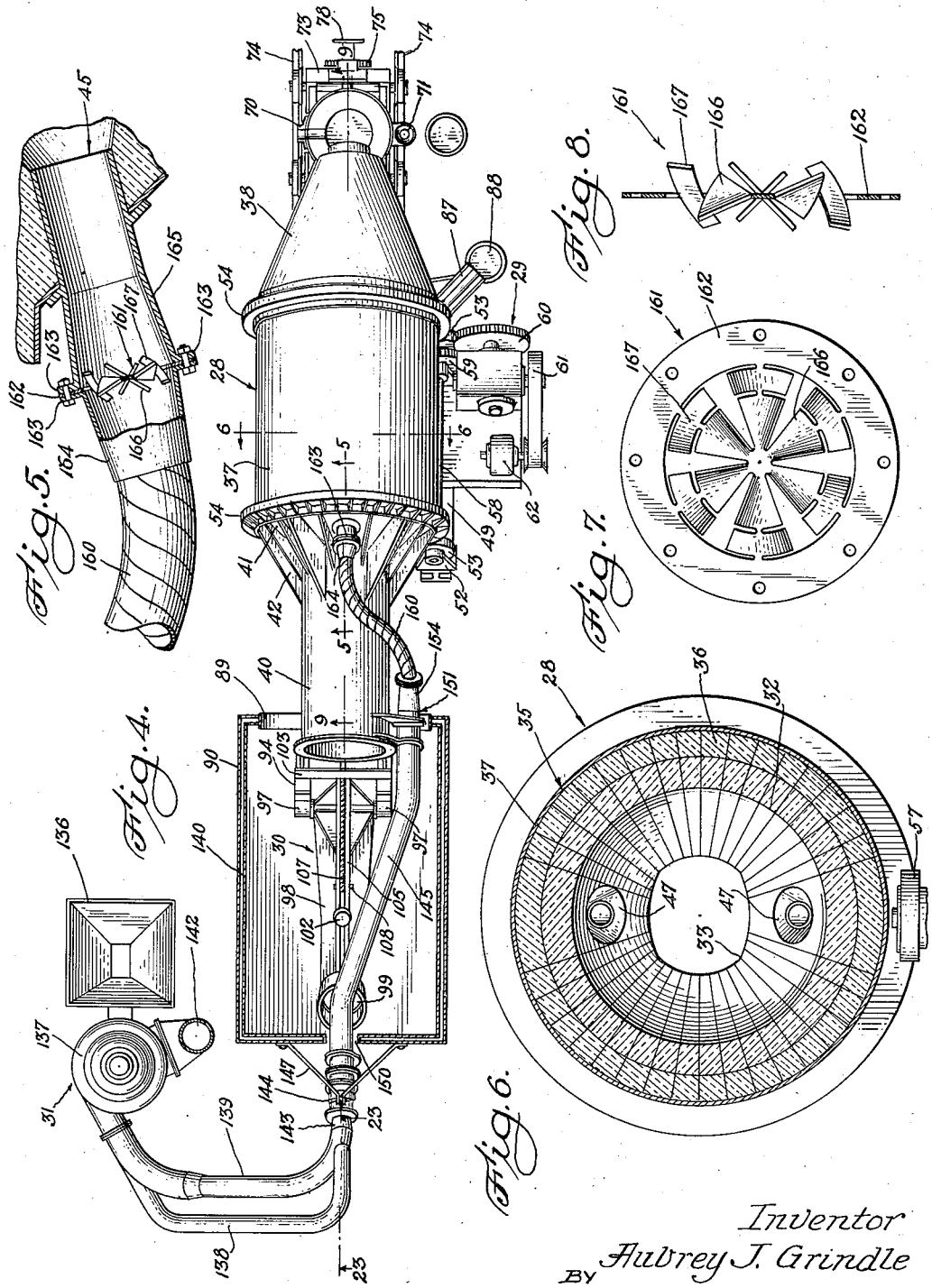

Dec. 26, 1939.  A. J. GRINDLE  2,184,297
MELTING APPARATUS
Filed Aug. 12, 1936   7 Sheets-Sheet 3
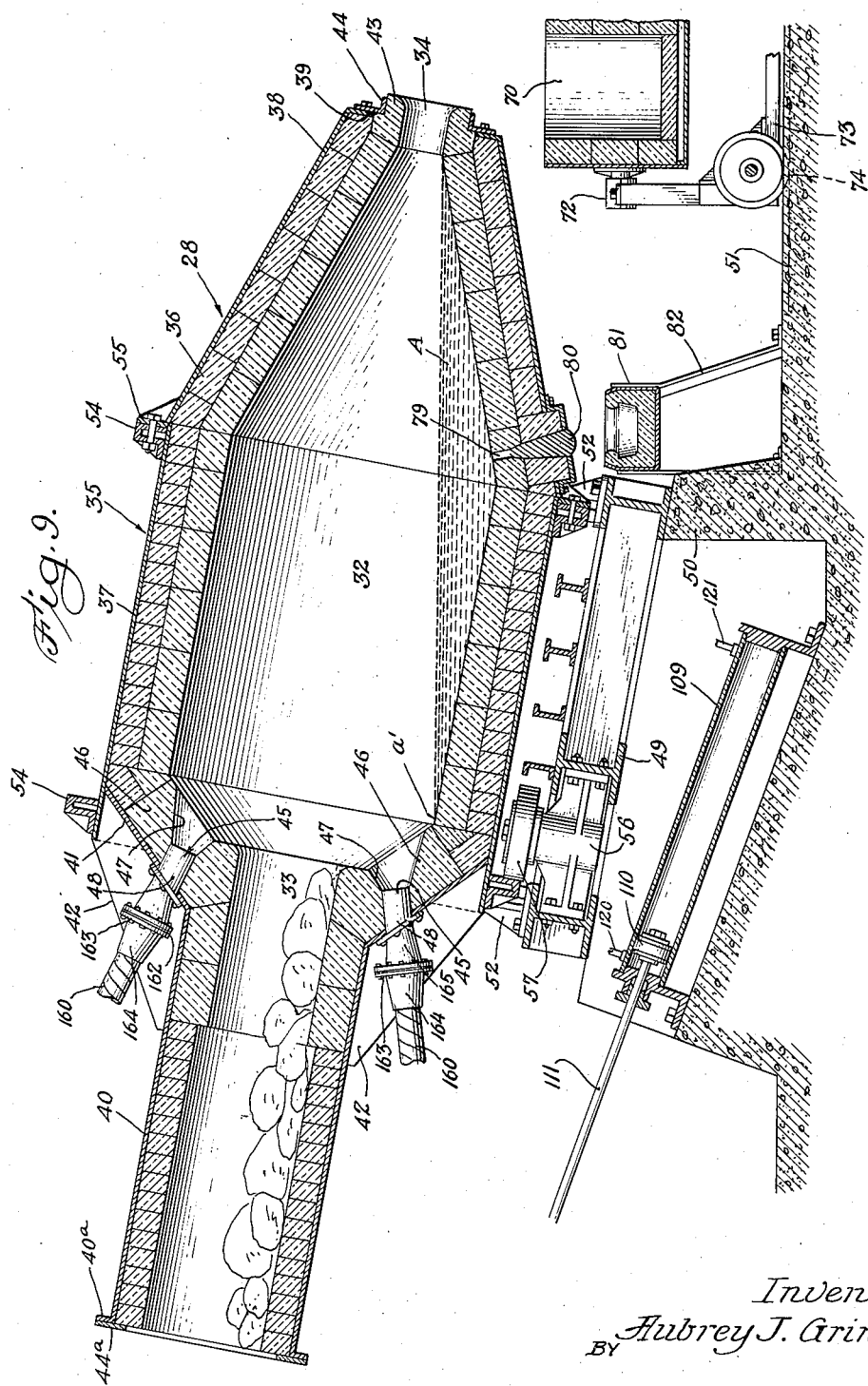
Inventor
Aubrey J. Grindle
BY
Parker, Carlson, Pitzner & Hubbard
Attorneys Inventor:
Aubrey J. Grindle
By Parker, Carlson, Pitzner & Hubbard
Attorneys Dec. 26, 1939.　　　A. J. GRINDLE　　　2,184,297
MELTING APPARATUS
Filed Aug. 12, 1936　　　7 Sheets-Sheet 5
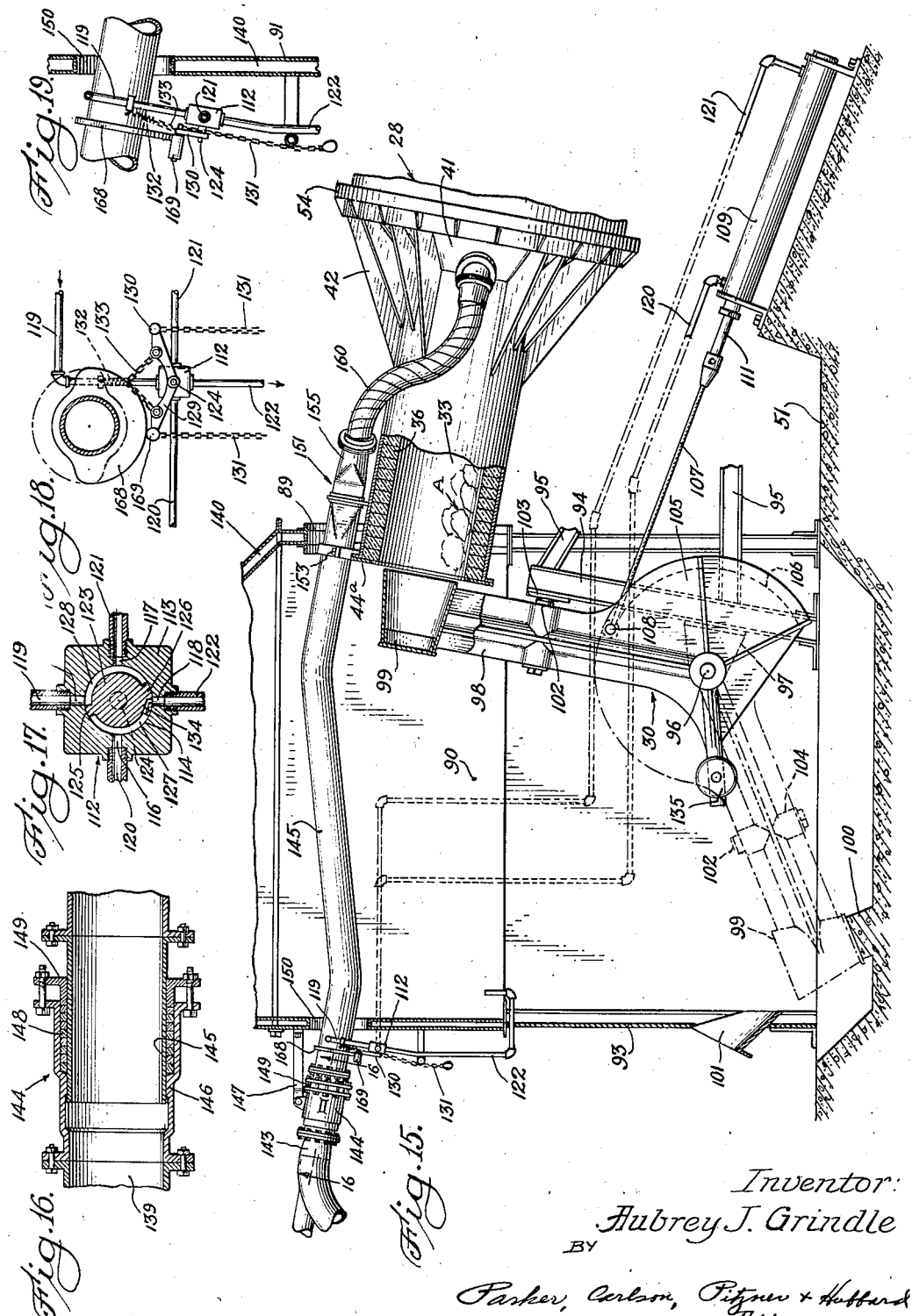
Inventor:
Aubrey J. Grindle
BY
Parker, Carlson, Pitzner & Hubbard
Attorneys Dec. 26, 1939.   A. J. GRINDLE   2,184,297
MELTING APPARATUS
Filed Aug. 12, 1936   7 Sheets-Sheet 6
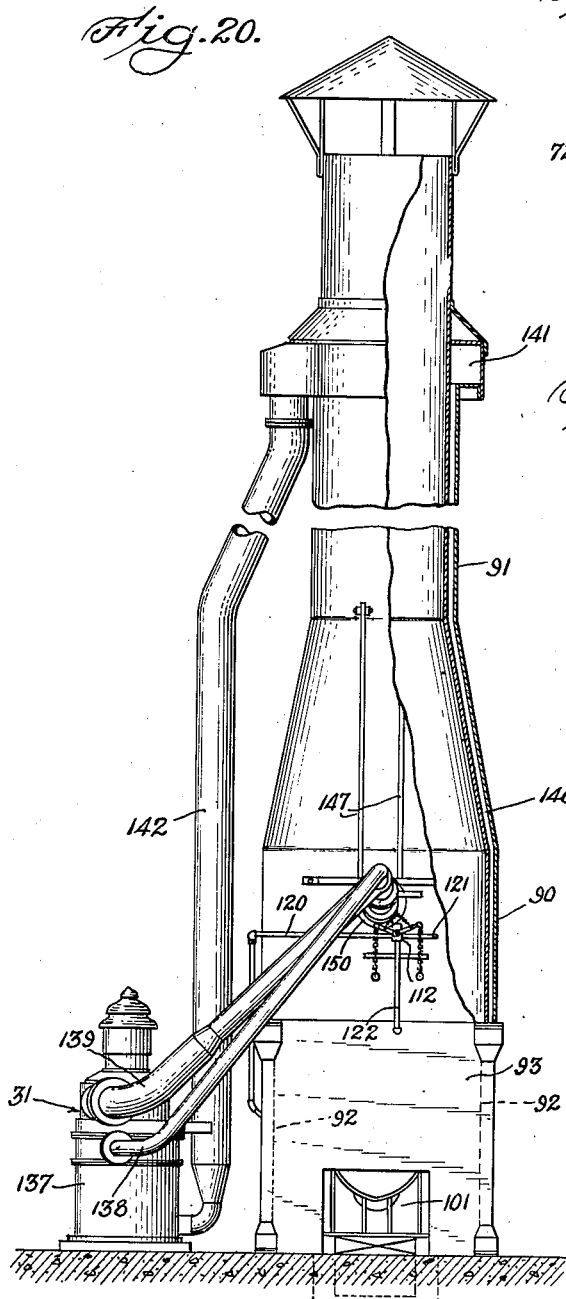
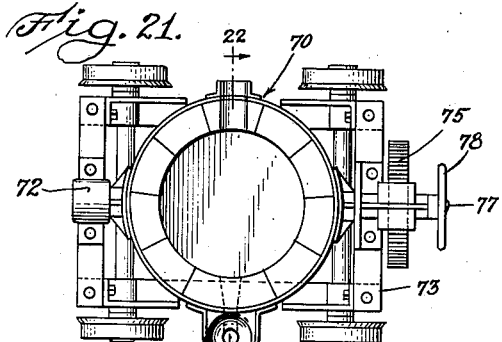
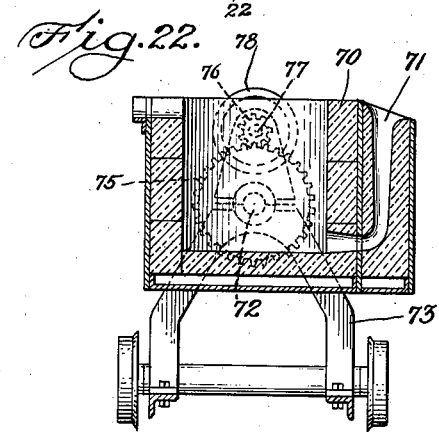
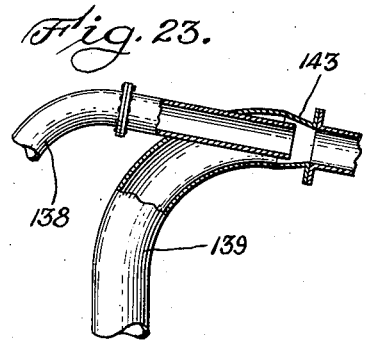
Inventor:
Aubrey J. Grindle
BY
Parker, Carlson, Pitzner & Hubbard
Attorneys.

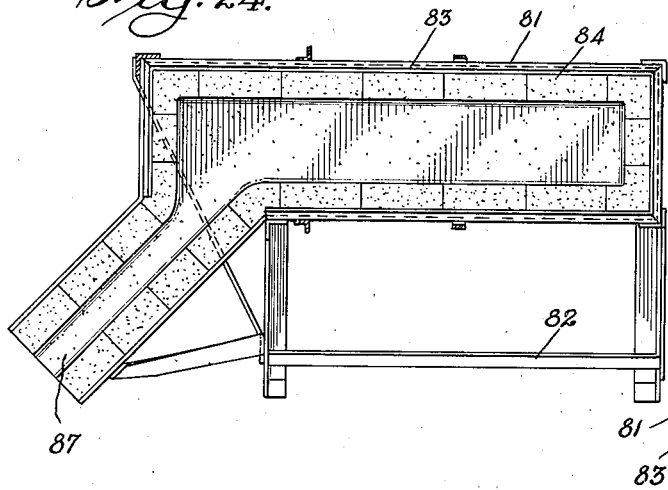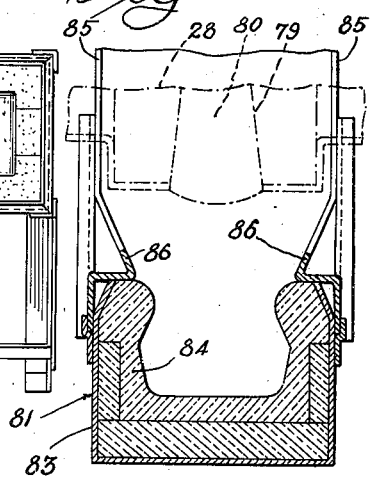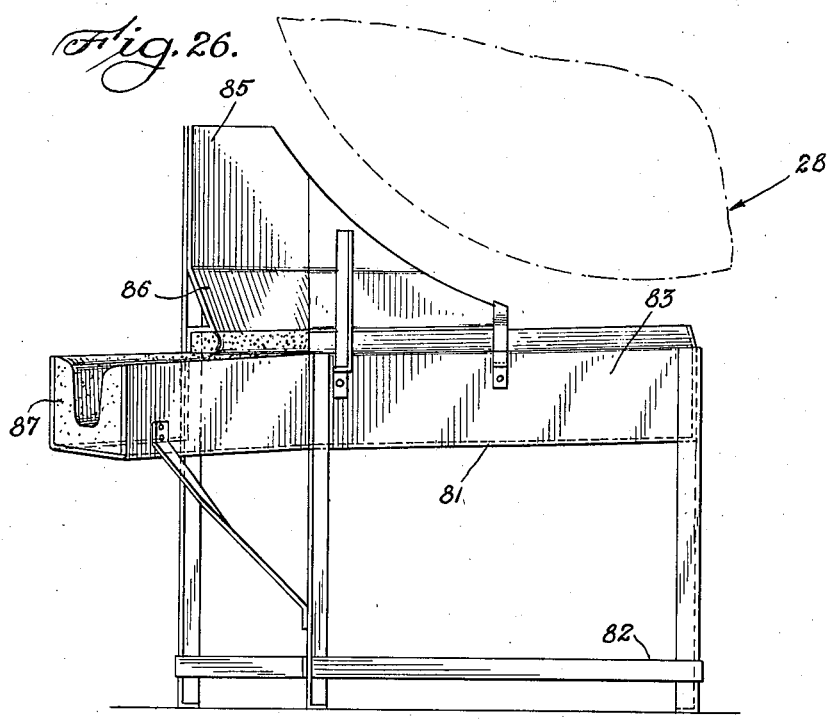

Patented Dec. 26, 1939

2,184,297

UNITED STATES PATENT OFFICE 2,184,297

MELTING APPARATUS

Aubrey J. Grindle, Chicago, Ill., assignor to Alwin F. Pitzner, Winnetka, Ill.

Application August 12, 1936, Serial No. 95,523

21 Claims. (Cl. 263—32)

The present invention relates to improvements in melting apparatus for various metals, such for example as iron and steel, and has particular reference to a melting apparatus having a novel rotary furnace.

Various objects reside in the provision in a new and improved melting apparatus of one or more of the following features:

1. A rotary furnace adapted for continuous or bath operation, and providing an elongated heating chamber having a large basin for the molten metal and a small outlet.

2. Power means for supporting and rotating the furnace in an inclined position.

3. A plurality of burners within the heating chamber arranged to provide efficient heating and to locate the hottest zone substantially over the deepest portion of the molten metal.

4. A novel loading mechanism for throwing the material to be treated into one end of the furnace.

5. Means for supplying and uniformly distributing a preheated and intimately mixed fuel to the burner.

6. Stacks for both ends of the furnace to carry away gases, fumes and products of combustion.

7. Novel means for receiving the molten material from the furnace.

8. Interlock means for preventing interference between the fuel supply means and the loading mechanism.

Numerous other objects reside in novel detail features of construction of the foregoing.

A general object is to provide a new and improved melting apparatus which is highly reliable, efficient in operation, which has a large capacity and low operating cost, and which is sturdy in construction.

Further objects and advantages will become apparent as the description proceeds.

In the accompanying drawings,

Figure 1 is a side elevational view, partially in vertical section, of a melting apparatus embodying the features of my invention.

Figs. 2 and 3 are fragmentary detail sectional views taken substantially along lines 2—2 and 3—3 of Fig. 1.

Fig. 4 is a plan view, partially in horizontal section, of the apparatus.

Fig. 5 is a fragmentary sectional detail view taken along line 5—5 of Fig. 4, and illustrating a fuel nozzle and mixer.

Fig. 6 is a transverse vertical sectional view taken along line 6—6 of Fig. 4 of the furnace forming part of the apparatus.

Fig. 7 is an enlarged elevational view of a fuel mixer at the inlet of the nozzle.

Fig. 8 is a diametrical sectional view of the mixer shown in Fig. 7.

Fig. 9 is a longitudinal vertical sectional view of the furnace on an enlarged scale taken along line 9—9 of Fig. 4.

Fig. 15 is a fragmentary view partially in vertical section and illustrating a loading mechanism for the furnace.

Fig. 16 is a sectional detail view of a coupling in the fuel supply line taken along line 16—16 of Fig. 15.

Fig. 17 is a transverse sectional view of a control valve for the loading mechanism.

Fig. 18 is a fragmentary detail view illustrating the valve operating mechanism.

Fig. 19 is a fragmentary detail view illustrating the valve operating mechanism in side elevation.

Fig. 20 is a left end elevational view of the melting apparatus.

Fig. 21 is a plan view of the metal receiving ladle.

Fig. 22 is a vertical sectional view of the ladle taken along line 22—22 of Fig. 21.

Fig. 23 is a sectional detail view taken along line 23—23 of Fig. 4.

Fig. 24 is a plan view of a metal receiving trough.

Fig. 25 is a transverse vertical sectional view of the trough.

Fig. 26 is a side elevational view of the trough.

Figure 10:
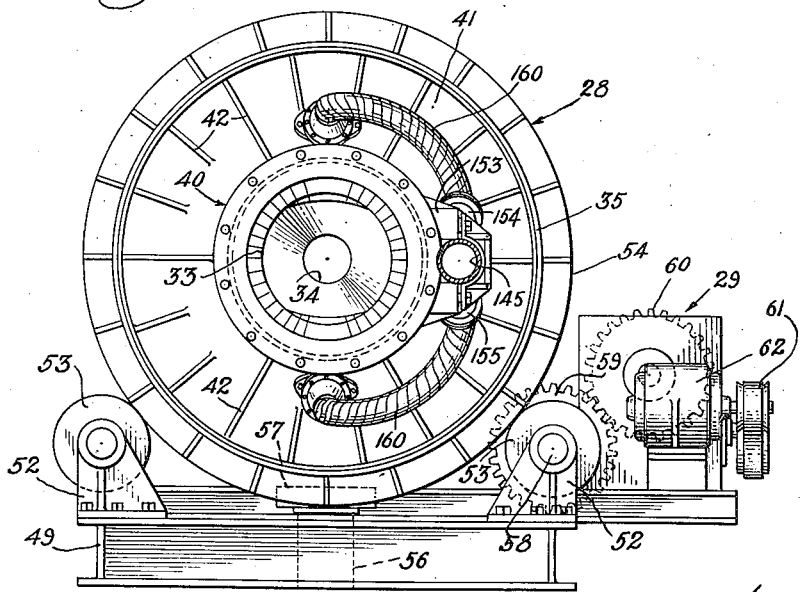
Fig. 10 is an end elevational view of the furnace and furnace drive.
Figure 11:
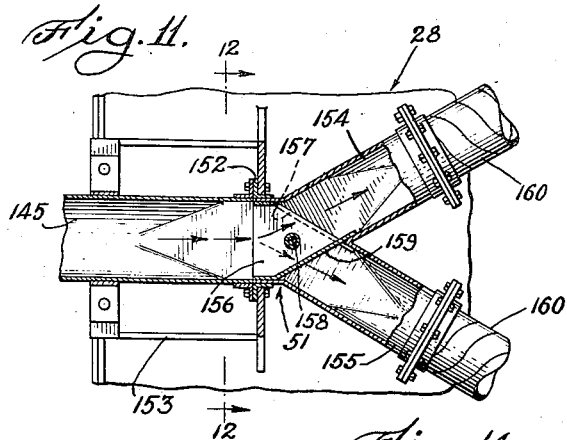
Fig. 11 is a fragmentary sectional view taken along line 11—11 of Fig. 1, and illustrating a fuel distributor.
Figure 12:
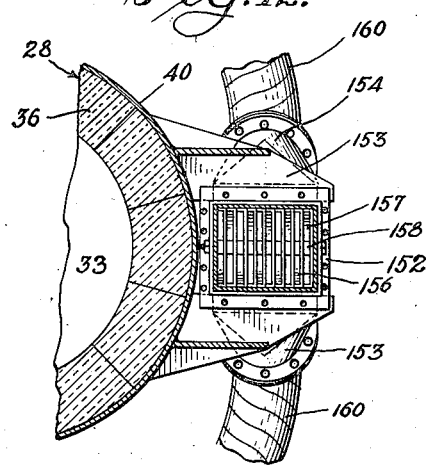
Fig. 12 is a fragmentary transverse sectional view taken along line 12—12 of Fig. 11.
Figures 13, 14:
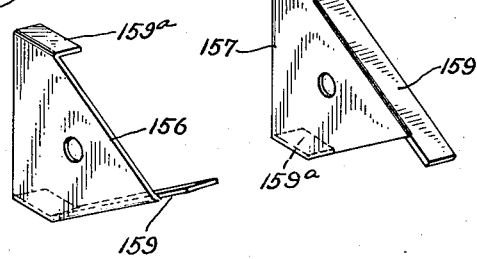
Figs. 13 and 14 are perspective views of baffle plates forming part of the distributor.

Referring more particularly to the drawings, the exemplary embodiment of the invention therein shown constitutes a melting apparatus adapted particularly for various metals, such for example as iron and steel, etc. In general, the apparatus comprises a rotary melting furnace 28 which is adapted to receive the metal to be melted at one end and to discharge the molten metal from the other end, and which may be used either for batch or continuous operations; a power driving mechanism 29 for rotating the furnace 28; a fluid pressure operated loading mechanism 30 for charging or catapulting the metal or material to be melted into the inlet end of the furnace 28; and a fuel feeding mechanism 31 for supplying a suitable combustible air-fuel mixture to the furnace 28.

*The rotary melting furnace and drive*

The furnace 28 (see Figs. 1, 4, 6, 9 and 10, and particularly Fig. 9) is elongated and mounted for rotation on its longitudinal axis. The interior thereof constitutes a heating and melting chamber 32 which has a restricted inlet throat 33 at one end, and the other end of which is conical and terminates in a restricted outlet or discharge opening 34. Preferably, the axis of rotation is slightly inclined out of the horizontal, with the inlet end of the heating chamber 32 uppermost. As a result, the charge indicated at A, tends to feed toward the discharge end, and the bottom of the chamber defines a shallow basin for the molten metal with a liquid line as indicated to the bottom edge of the opening 34. Thus, the basin extends substantially the full length of the chamber 32, and at the same time the opening 34 need only be large enough to permit the molten metal and slag to discharge. It is to be noted in this connection that the inclination is such that the molten metal extends substantially up to the point a'.

In its preferred construction, the furnace 28 comprises an outer metallic casing or shell 35 lined internally with a suitable refractory material 36 having insulating properties. The shell 35 consists of an intermediate section 37 which is cylindrical in form and adapted to be supported in a horizontally inclined position for a rotary drive, a conical discharge end section 38 having an annular end wall 39, and an inlet end section 40 in the form of an elongated cylindrical duct and integrally connected by a short conical section 41 to the section 37. Suitable gusset plates or braces 42 of varying length are provided to reinforce the shell 35 at the juncture between the sections 37 and 40. The section 38 is removable to permit lining and repair of the furnace 28.

The refractory lining 36 conforms to the interior of the shell 37, and over most of the area consists of an outer layer preferably of clay fire brick and an inner layer preferably of silica. At the discharge end, the lining 36 has a tubular extension 43 which projects through the wall 39 and which defines the opening 34, the outer end of the latter preferably being flared or rounded to facilitate pouring. A flanged ring 44 encircles the extension 43, and is removably bolted to the wall 39. The outer end portion of the tube 40, being somewhat removed from the hottest zone, is lined with fire brick, and the inner end portion of the tube and the conical section 41 are lined with a thick layer of silica. To retain the refractory material in the tube 40, an annular plate 44ª is secured to an outer peripheral flange 40ª on the tube, and overlaps the material.

The inlet throat 33 is defined by the refractory lining, and is elliptical in cross-section as shown in Fig. 10. It provides an outlet for fumes and gases of combustion, and an inlet for the iron, ore or other material to be treated or melted. The oval or elliptical form of the throat 33 causes the material to pass to the chamber 32 at the ends of the major axis. The material is preheated in the throat 33, and may in fact be partially or entirely melted therein before actually reaching the chamber 32.

To heat the furnace 28, one or more suitable burners 45 are mounted to discharge into the chamber 32. In the present instance, two powdered fuel burners 45 are mounted in the lined section 41 at opposite ends of the minor axis of the throat 33 in position to discharge a plurality of jets or streams of air-fuel mixture longitudinally into the chamber 32. Each burner comprises a block 46 which forms part of the refractory lining, and which is formed with an opening 47 flared at the inner end. A burner nozzle 48 of tubular construction extends into the outer end of the opening 47, and is bolted to the shell section 41. The burners 45 are adapted to be connected to a suitable supply of fuel as hereinafter described. By locating the burners 45 at the end of the minor axis of the throat 33, the solid or fluid material avoids passing directly thereover on its way into the chamber 32.

The burners 45 are relatively inclined in the longitudinal plane of the furnace 28 through the minor axis of the throat 33 so that the streams of fuel mixture will converge symmetrically toward the axis of rotation. The preferred degree of inclination is determined by a number of factors. Thus, it is desirable that the flames converge at a point as near as practicable to the discharge end so that the hot gases of combustion will be deflected and caused to travel back over the metal. At the same time, the flames should not strike the surface of the molten bath before combustion is fairly complete. Also, it is desirable that the point at which the flames converge be located substantially over the deepest portion of the molten metal. The taper of the lined section 38 serves to locate the deepest point of the metal near the hottest point of the furnace chamber 32.

In operation, the material being treated is heated directly by the products of combustion which reverse in flow and pass out through the throat 33. Also, the refractory lining 36 becomes highly heated, and in the rotation of the furnace 28 serves to heat the material.

The furnace 28 may be supported by any suitable means for a rotary drive. In the present instance, this means comprises a rectangular supporting frame 49 which is mounted in an inclined position on an elevated base 50 on a stationary foundation 51. Rotatably supported in upstanding brackets 52 on the frame 49 at opposite sides of the shell 35 are a plurality of rollers 53. These rollers respectively engage peripherally with two circular rails 54 encircling and secured to opposite ends of the intermediate section 37 of the shell 35, and thereby serve to support the latter. The large end of the conical shell section 38 has an outer peripheral flange 55 which is removably bolted to the lowermost rail 54 to complete the shell assembly. Mounted in the upper end portion of the frame 49 is a thrust bearing 56. A thrust roller 57 is journaled in the bearing 56 on a generally vertical axis, and engages the lower side of the uppermost rail 54 to support the shell 35 against endwise movement, and particularly to maintain the rollers 53 and the rails 54 in proper engagement.

The rotary drive (see Figs. 1, 4 and 10) for the furnace 28 is transmitted to the rails 54 through frictional engagement with the rollers 53 at one side which are fixed on a common drive shaft 58. This shaft is connected through gears 59 and 60 to a variable-speed transmission 61 driven by an electric motor 62.

The discharge end of the furnace 28, and particularly the refractory extension 43 projects through an opening 63 in one side of the base 64 of a stack 65 which serves to carry away fumes from the metal and also any products of combustion that may escape through the opening 34. A plurality of openings 66 with removable covers 67 are provided in the stack base 64. One of these openings 66 (see Fig. 1) is substantially in axial alignment with the opening 34 and is therefore conveniently available for charging the furnace by means of a spoon (not shown) with alloys or petroleum carbon or other materials for changing the analysis or composition of the finished product. The other openings 66 are located at the opposite sides of the extension 43, and affords access for various purposes, such for example as the removal of slag tending to clog the discharge opening 34.

The stack 65 is supported in elevated position by means of hanger bars 68 suspended from a suitable support, such as a roof 69, and the base 64 is flared downwardly and open at the bottom to permit the metal discharging from the opening 34 to pour into a suitable container 70. In the present instance, the container 70 is shown as a large steel ladle or bucket having a discharge spout 71, and pivotally mounted by means of trunnions 72 on a truck 73 (see Figs. 21 and 22). The truck 73 is adapted to be moved on suitable tracks 74 in the foundation 51 into position beneath the stack base 64. To provide means for swinging the ladle 70, a large gear 75 is fixed on one of the trunnion shafts, and meshes with a pinion 76 on a shaft 77 journaled in the frame of the truck 73 and having a hand wheel 78 fixed thereon. It will be understood that the container 70 is utilized for continuous furnace operation.

The furnace 28 also is provided with a discharge opening 79 in the wall of the lined shell section 38 adjacent the deepest point of the metal. This opening is primarily intended to discharge the metal at the end of a batch operation, and normally is closed by a plug 80. However, it may also be used during a continuous operation, the plug 80 in this case being withdrawn.

Mounted beneath the furnace 28 to receive metal from the opening 79 when the latter is in its lowermost position is a trough 81 (see Figs. 1, 9 and 24 to 26). The trough 81 may be supported on a suitable frame 82 on the foundation 51, and in its preferred form is open at the top throughout its length and extends transversely of the furnace 28 to underlie the entire lower course of the path of the opening 79. Preferably, the walls of the trough are closed at the bottom, sides and ends, and consist of an outer metal casing 83 lined with a suitable refractory material 84. In cross-section (see Figs. 9 and 25), the trough 81 is somewhat constricted at the top, and the upper inside edges of the material 84 are rounded. Two parallel upstanding guard plates 85 are secured respectively to opposite sides of the trough 81, and at their upper edges conform closely to the curvature of the shell section 38 at opposite sides of the opening 79. The lower edge portions of the plates 85 rest on the side walls of the trough 81, and are struck inwardly to define inclined guides 86 for directing stray metal into the trough opening. The trough 81 is vertically inclined from end to end, and is provided at its lowermost end with a discharge spout 87 of the same general construction. Preferably, the spout 87 is horizontally inclined to extend at an angle of approximately 45° to the furnace axis into a convenient position over a receiving bucket or ladle 88.

The outer end of the duct 40 extends through a flanged opening 89 in the enlarged base 90 of a stack 91 for carrying away gases, fumes and products of combustion from the furnace 28. The base 90 is open at the bottom and mounted in elevated position on a support 92 consisting of a plurality of I-columns on the foundation 51. The support 92 is open between the I-columns at the sides and adjacent the furnace 28, and has a wall 93 closing the space between the columns remote from the furnace.

*The charging mechanism*

The charging mechanism 30 (see Figs. 1 to 4, 15 and 17 to 19) is mounted below the stack 91 in position to introduce the material to be treated into the open end of the duct 40 within the stack base 90. In its preferred construction, the charging mechanism 30 comprises an open upright frame 94 which is mounted on the foundation 51, and supported in a position slightly inclined from the vertical and substantially in the plane of the inlet end of the duct 40. Suitable struts 95, anchored to the elevated base 50, are provided as auxiliary supports for the frame 94.

Mounted on a horizontal rock shaft 96, extending transversely of the furnace 28 and journalled in bearing brackets 97 on the frame 94 is a swinging arm 98. A charging bucket 99 is rigid with the free end of the arm 98, and is adapted to be oscillated or swung thereby from an idle or filling position into an elevated position directly in line with the open end of the duct 40 as illustrated in Fig. 15. The idle position is defined by a stop or rest 100 on the foundation 51 for engagement by the bucket 97. When in idle position, the bucket 97 directly underlies a chute 101 mounted in and opening through the wall 93. The elevated position is determined by engagement of an impact head 102, mounted in an intermediate portion of the arm 98, with a fixed stop or plate 103 on the upper end of the frame 94. The head 102 (see Fig. 3) preferably consists of a plunger urged outwardly into an extended position by a coiled compression spring 104. In its upward movement, the arm 98 comes to a sudden stop when the head 102 engages the plate 103, thereby causing the material in the bucket 99 to be thrown or catapulted into the duct 40.

To provide power means for actuating the bucket 99, the pivoted end portion of the arm 98 is formed with a concentric arcuate segment 105 (see Fig. 2) with a peripheral groove 106. A rope or cable 107 extends along the groove 106, and is securely anchored at one end to the arm 98 by means of a pin 108. The other end of the cable 107 is connected to a fluid motor, which in the present instance (see Fig. 9) comprises a cylinder 109 mounted in fixed position on the foundation 51 beneath the frame 49, and extending tangentially of the groove 106. A piston 110 is reciprocably disposed in the cylinder 109, and has an elongated piston rod 111 to which the cable 107 is connected.

Any suitable fluid medium, such as air under pressure, may be supplied under the control of a valve 112 (see Figs. 17 to 19) to the cylinder 109 to elevate the bucket 99, and subsequently relieved to permit return of the bucket under the force of gravity into idle position. The valve 112 comprises a body 113 having a bore 114 with peripherally spaced ports 115 to 118. The upper port 115 is open to a pipe 119 which may be connected to any suitable source of compressed air (not shown). The side ports 116 and 117 are connected to two pipes 120 and 121 leading respectively to opposite ends of the cylinder 109. The lower port 118 is connected to a pipe 122 opening to the atmosphere in the stack base 90. Rotatably adjustable in the bore 114 is a valve member 123 having an actuating shaft 124 and having diametrically opposed land areas 125 and 126 defining intermediate peripheral spaces 127 and 128. Two oppositely extending levers 129 and 130 are fixed on the shaft 124, and carry suspended chains 131 by which the valve may be actuated manually.

The valve member or plug 123 is normally held in neutral position in which the land areas 125 and 126 block the ports 115 and 118. The means for this purpose comprises a tension spring 132 which is anchored at one end to the pipe 119 and which is connected at the other end to an intermediate chain link 133 anchored at opposite ends to the levers 129 and 130. In operation, when the valve member 123 is rotated out of neutral in a clockwise direction, air will be supplied freely to the pipe 120 and the pipe 121 will be connected to the unrestricted exhaust, thereby causing the bucket 99 to be elevated rapidly until the head 102 impinges against the stop 103. Movement of the valve member 123 in a counter-clockwise direction past neutral position will connect the pipe 121 to pressure and the pipe 120 to exhaust to lower the bucket 99. In this position, the land area 126, which is wider than the area 125, covers the port 118, but establishes the exhaust connection through a restricted bleed passage 134 adapted to throttle the discharge from the pipe 120 so as to cause the return movement of the bucket 99 to be comparatively slow.

To facilitate ease of operation, a counterweight 135 is fixed on the shaft 96. When the bucket 99 is in idle position, the counterweight 135 is located at the opposite side of the shaft 96, and reduces the required lifting power. When the bucket 99 is in elevated position, the counterweight is located forwardly of the shaft 96, and serves to overcome any tendency of the bucket to stay up.

Fuel feeding mechanism

The fuel feeding mechanism 31 (see Figs. 3 to 5, 7, 8, 10 to 16, 20 and 23) is adapted to supply a mixture of powdered fuel and air to the burners 45 in all positions of rotation of the furnace 28. The fuel, such as coal, is supplied from a hopper 136 to a pulverizer 137 which is not shown in detail since per se it forms no part of the present invention. It is sufficient to say that the pulverizer 137 has two outlet ducts 138 and 139 of which the first discharges a primary mixture of air and suspended or entrained powdered fuel at a definitely maintained velocity, and the latter is adapted to supply a variable amount of secondary air.

The air entering the pulverizer 137 is preheated by the gases in the stack 91. To this end, the stack 91 is of double-walled construction to define a peripheral air space 140 open at the lower end to receive air from the atmosphere. The upper end of the space 140 opens to an enlarged annular chamber or bustle 141, near the top of the stack 91. A vertical duct 142 leads the air from the chamber 141 to the inlet of the pulverizer 137. Preheating the air reduces the power required to operate the pulverizer 137, and also dries the powdered coal and renders it more friable.

The air duct 139 has a conical mixing and induction throat 143 (see Fig. 23) at the discharge end, and is connected through an expansion and swivel joint 144 (see Fig. 16) to a fuel duct 145 extending through the base 90 of the stack 91 to the furnace 28. The primary fuel duct 138 is connected to the duct 139 to discharge axially into the throat 143 to complete the ultimate fuel mixture. By supplying the primary mixture separately of the secondary air, adequate air velocity for entraining the fuel is always maintained regardless of variations in the total volume of air in the ultimate mixture.

The expansion and swivel joint 144 comprises an outer sleeve 146 bolted to the discharge end of the duct 139 and supported from the stack 91 by a plurality of hanger bars 147. The inlet end of the duct 145 telescopes slidably and rotatably into the sleeve 146. A suitable packing 148 is confined between the duct 145 and the sleeve 146 by an adjustable gland 149.

The duct 145 extends through an opening 150 into the stack base 90, and is connected at its discharge end to a distributor 151 (see Figs. 11 to 14) mounted on one side of the duct 40 of the furnace 28. It will be evident that the fuel mixture will be highly preheated in passing through the duct 145. By preheating first the air as described, and then the fuel mixture, a substantial heat reclamation and economy is effected, and the subsequent combustion of the fuel is quicker and more efficient.

In its preferred form, the distributor 151 comprises a closed rectangular housing 152 mounted in a bracket 153 on one side of the duct 40. The outlet end of the duct 145 is enlarged to rectangular form and clamped to the bracket 153 and opens to the housing 152. The latter has two relatively inclined outlet sleeves 154 and 155 which in effect constitute a forked discharge. To insure a uniform distribution of the fuel mixture to the sleeves 154 and 155, a plurality of alternate baffle plates 156 and 157 are secured in nested relation on a tie bolt 158 in the bracket 153. The plates 156 and 157 are flat, and formed with side flanges 159 and 159ª to effect the proper spacing and to define a series of parallel passages. Of the plates 156, the flanges 159 are elongated and inclined to extend into the sleeve 154, and hence to direct the fuel mixture passing through the associated passages entirely to the sleeve. The flanges 159 of the plates 157 are similar in form, but inclined to direct fuel mixture to the sleeve 155. The sleeves 154 and 155 are connected respectively by flexible tubes 160 to the two burner nozzles 48.

Interposed at the inlet of each burner nozzle 48 is a fuel mixer 161 (see Figs. 5, 7 and 8). In its preferred construction, each mixer 161 comprises a circular disk 162 which is bolted at the peripheral margin between outer peripheral flanges 163 on an expanding cone member 164 and a cone member 165 at the inlet of the nozzle 48. Two concentric sets of peripherally spaced vanes 166 and 167 are formed in the central portion of the disk 162. The vanes 166 and 167 are twisted respectively in opposite directions to extend at both sides out of the plane of the disk, and hence create a high degree of turbulence.

It will be evident that in the rotation of the furnace, the duct 145 will be revolved thereby about the axis of the coupling 144. Longitudinal expansion and contraction of the duct 145 are permitted by the coupling 144.

To prevent interference between the charging apparatus 30 and the duct 145, means is provided for preventing clockwise adjustment of the control valve 112 except when the duct is passing through the upper course of its orbital movement. In the present instance, this means comprises a rotary cam 168 (see Figs. 18 and 19) fixed on the duct 145 and adapted for engagement with a roller 169 on the free end of the arm 129. The cam 168 has an arcuate face extending approximately through 180°, and adapted to hold or depress the arm 129 into neutral position. Downward movement is permitted, but this will not effect elevation of the bucket 99. The other half of the cam 168 has an arcuate face of a smaller radius, and when disposed over the arm 129 permits free adjustment of the valve 112 into any selected position.

While I have disclosed the invention as applicable particularly to the melting of metals, it is to be understood that the invention may be utilized for treating various kinds of materials not necessarily involving melting.

I claim as my invention:

1. In a heating apparatus, a rotary furnace comprising, in combination, an elongated outer wall lined internally with refractory material and defining a heating chamber having an inlet at one end and a discharge opening at the other end, burners mounted in said wall eccentrically of the axis of said furnace for movement therewith and opening to said chamber, means for supplying fuel to said burners in all positions of rotation of said furnace, and power means for rotating said furnace continuously in one direction.

2. In a heating apparatus, a rotary furnace comprising, in combination, an elongated outer wall mounted for rotation on a vertically inclined axis and lined internally with refractory material, the interior defining a heating chamber enlarged intermediate its ends, with an elongated inlet throat of reduced size at the uppermost end and a discharge opening of reduced size at the other end, means for heating said chamber and said refractory including a plurality of burners mounted on said furnace at opposite sides of said throat, and means for rotating said furnace on said axis.

3. In a heating apparatus, a rotary furnace comprising, in combination, an elongated outer wall mounted for rotation on a vertically inclined axis and lined internally with refractory material, the interior defining a heating chamber enlarged intermediate its ends, with an elongated inlet throat of elliptical cross-section at the upper end and a discharge opening at the other end, a plurality of burners spaced about said throat for heating the interior of said furnace, and means for rotating said furnace.

4. In a heating apparatus, a rotary furnace comprising, in combination, an elongated outer wall mounted for rotation on a vertically inclined axis and lined internally with refractory material, the interior defining a heating chamber enlarged intermediate its ends, with an inlet throat of elliptical cross-section at the upper end and a conical discharge opening at the other end, two burners mounted in said wall at opposite ends of the minor axis of said throat to heat said chamber, and means for rotating said furnace.

5. In a heating apparatus, a rotary furnace comprising, in combination, an elongated outer wall mounted for rotation on a vertically inclined axis and lined internally with refractory material, the interior defining a heating chamber enlarged intermediate its ends, with an inlet throat of elliptical cross-section at the upper end and a discharge opening at the other end, two burners mounted in said wall at opposite ends of the minor axis of said throat to heat said chamber and inclined toward each other to discharge converging streams of fuel mixture along the axis of rotation toward said discharge opening, and means for rotating said furnace.

6. In a heating apparatus, a rotary furnace comprising, in combination, an elongated outer wall having an intermediate substantially cylindrical section, a conical section on one end terminating in a relatively small coaxial discharge opening with an outwardly flared pouring edge, a conical burner block section merging into the other end of said cylindrical section, and an elongated inlet duct defining an inlet throat of elliptical cross-section and opening through said burner block section, the interior of said wall being lined with refractory material and defining a heating chamber adapted to contain a bath of the material to be treated, said furnace being vertically inclined with the inlet duct at the uppermost end of the axis of rotation whereby said bath has a deep point intermediate its ends and a liquid line extending from said burner block section to said discharge opening, two burners mounted in said burner block section at opposite ends of the minor axis of said throat, and being inclined to discharge converging streams of fuel mixture along the axis of rotation toward said discharge opening with the point of juncture substantially over said deep point, and means for rotting said furnace.

7. In a heating apparatus, in combination, an elongated rotary furnace having an enlarged cylindrical portion intermediate its ends, two rails encircling opposite ends of said portion, a vertically inclined unitary supporting frame, a plurality of rollers journaled on said frame, and engaging the peripheries of said rails to support said furnace for rotation on a vertically inclined axis, a roller journaled in said frame between said rollers and engaging the lower side of the uppermost rail to locate said furnace axially, and means for driving certain of said rollers to rotate said furnace.

8. In a heating apparatus, in combination, a vertically inclined rotary furnace having an inlet at its uppermost end and a discharge adjacent its lowermost end, a vertical stack receiving said inlet end and adapted to direct fumes, gases and other products of combustion therefrom, a stack receiving said discharge end of said furnace, a ladle removably mounted beneath said last mentioned stack to receive treated material from said furnace, power actuated means for catapulting material to be treated into the inlet end of said furnace, means for heating the interior of said furnace, and a powdered fuel apparatus for supplying a preheated fuel mixture to said heating means.

9. In a rotary heating apparatus, an elongated rotary furnace mounted on a vertically inclined axis and having an internal heating chamber comprising an intermediate coaxial cylindrical portion and a lower end coaxial conical portion, an inlet at the uppermost end of said chamber, means defining an axial outlet at the apex of said conical portion for discharging treated material in a continuous operation, the interior of said chamber at the juncture of said cylindrical and conical portions extending below said outlet to contain a bath of material adapted to be heated by the refractory in the rotation of the furnace, and a normally closed supplemental outlet opening through the wall of said furnace for discharging material from the depest point of said bath.

10. In a rotary heating apparatus, in combination, a rotary furnace having an inlet at one end and an outlet at the other end, a double walled stack communicating with said inlet and defining a peripheral air space and opening at the lower end to the atmosphere, a fuel pulverizer having a fuel inlet and an air inlet, means for connecting the upper end of said air space to said air inlet, means for supplying an air-fuel mixture from said pulverizer to said furnace, said last mentioned means including a fuel duct extending transversely through said stack.

11. In a heating apparatus, in combination, a rotary furnace having an inlet at one end and a discharge adjacent its other end, a double walled vertical stack receiving said inlet and adapted to direct fumes, gases and other products of combustion therefrom and defining an air space open at one end to the atmosphere, power actuated means for introducing material to be treated into said inlet, burner means for heating the interior of said furnace, and means for supplying an air-fuel mixture to said burner means and having an air intake connected to the other end of said air space.

12. A heating apparatus comprising a rotary furnace having an inlet at one end, burner means mounted on said furnace for movement therewith and to discharge a mixture of fuel and air thereto, a source of fuel having an outlet line, a fuel duct having a swivel joint at one end with said line in axial alignment with said furnace and attached at the other end to said furnace for orbital movement, means connecting said duct to said burner means, power operated means for charging material to be treated into said inlet and including a control member, and cam means rotatable with said duct and cooperating with said control member to prevent operation of said power means when said duct is located in the course of movement crossing the path of said charging means.

13. A rotary melting apparatus comprising a rotary furnace having an inlet at one end, burner means mounted on said furnace for movement therewith and to discharge a mixture of fuel and air thereto, a source of fuel having an outlet line, a fuel duct having a swivel and expansion joint at one end with said line in axial alignment with the furnace and attached at the other end to said furnace for orbital movement, means connecting said duct to said burner means, and power operated means for elevating material to be treated into said furnace.

14. In a heating apparatus comprising, in combination, a rotary furnace, means for supporting said furnace for rotation, means for rotating said furnace continuously in one direction, a powdered fuel burner having an inlet line and mounted on said furnace for movement therewith and to discharge an air-powdered fuel mixture thereto, and a fuel mixer interposed in said line at the inlet of said burner, said mixer comprising a peripherally held disk formed with a plurality of concentric sets of oppositely twisted vanes.

15. In a rotary heating apparatus comprising, in combination, a rotary furnace, two powdered fuel burners mounted on said furnace for movement therewith and to discharge an air-powdered fuel mixture thereto, a fuel mixer interposed in the inlet of each burner, a fuel supply line, and a distributor for connecting said line to said burners, said distributor having a housing with two relatively inclined discharge sleeves, a plurality of nested baffles in said housing and formed with flanges adapted alternately to direct fuel from said line respectively to said sleeves.

16. In a rotary heating apparatus comprising, in combination, a rotary furnace, power means for rotating said furnace continuously in one direction, powdered fuel burners mounted on said furnace for movement therewith and to discharge an air-powdered fuel mixture thereto, a fuel mixer interposed in the inlet of each burner, a fuel supply line, and a distributor for connecting said line to said burners and including means for uniformly proportioning the fuel to said burners.

17. In a heating apparatus, a rotary furnace on a generally horizontal axis and having a discharge opening in its peripheral wall, a narrow trough extending transversely of and underneath the lower course of movement of said opening, and upstanding guard plates on the sides of said trough and conforming generally to the curvature of said furnace so as to direct the discharge from said opening into said trough.

18. In a heating apparatus, a rotary furnace comprising, in combination, an elongated outer wall mounted for rotation on the vertically inclined axis and lined internally with refractory material, the interior defining a heating chamber enlarged intermediate its ends, with an inlet throat of elliptical cross section at one end, two burners mounted in said wall at opposite ends of the minor axis of said throat to heat said chamber, and means for rotating said furnace, the material passing through said throat tending to flow therethrough at the opposite ends of the major axis of said throat.

19. In a heating apparatus, in combination, a vertically inclined rotary furnace having an inlet at its uppermost end and a discharge adjacent its lowermost end, a vertical stack receiving said inlet end and adapted to direct fumes, gases and other products of combustion therefrom, power actuated means for catapulting material to be treated into the inlet end of said furnace, means for heating the interior of said furnace, and means for supplying a preheated fuel mixture to said heating means.

20. A heating apparatus comprising a rotary furnace having an inlet at one end, burner means mounted on said furnace for movement therewith and to discharge a mixture of fuel and air thereto, a source of fuel having an outlet line, a fuel duct having a swivel joint at one end with said line substantially in axial alignment with said furnace and attached at the other end to said furnace for orbital movement, means for connecting said duct to said burner means, and drive means for rotating said furnace.

21. A heating apparatus comprising a rotary furnace having an inlet at one end, burner means mounted on said furnace for movement therewith and to discharge a mixture of fuel and air thereto, a source of fuel having an outlet line, a fuel duct having a swivel joint at one end with said line in axial alignment with said furnace and attached at the other end to said furnace for orbital movement, means connecting said duct to said burner means, power operated means for charging material to be treated into said inlet and including a control member, and means coacting with said control member to prevent operation of said power means when said duct in the course of orbital movement is crossing the path of said charging means.

AUBREY J. GRINDLE.